US010847269B2

United States Patent
Noonan et al.

(10) Patent No.: US 10,847,269 B2
(45) Date of Patent: Nov. 24, 2020

(54) COMBINED NEUTRON SHIELD AND SOLENOID

(71) Applicant: Tokamak Energy Ltd., Oxfordshire (GB)

(72) Inventors: Paul Noonan, Kidlington (GB); Marcel Kruip, Abingdon (GB)

(73) Assignee: Tokamak Energy Ltd., Oxfordshire (GB)

( * ) Notice: Subject to any disclaimer, the term of this patent is extended or adjusted under 35 U.S.C. 154(b) by 0 days.

(21) Appl. No.: 16/607,391

(22) PCT Filed: Apr. 23, 2018

(86) PCT No.: PCT/GB2018/051055
§ 371 (c)(1),
(2) Date: Oct. 23, 2019

(87) PCT Pub. No.: WO2018/179846
PCT Pub. Date: Nov. 1, 2018

(65) Prior Publication Data
US 2020/0135343 A1    Apr. 30, 2020

(30) Foreign Application Priority Data

Apr. 26, 2017    (GB) .................................. 1706648.1

(51) Int. Cl.
| | | |
|---|---|---|
| *G21B 1/11* | (2006.01) | |
| *G21B 1/05* | (2006.01) | |
| *G21F 1/04* | (2006.01) | |
| *G21F 1/08* | (2006.01) | |
| *G21F 3/00* | (2006.01) | |

(52) U.S. Cl.
CPC .............. *G21B 1/11* (2013.01); *G21B 1/057* (2013.01); *G21F 1/04* (2013.01); *G21F 1/08* (2013.01); *G21F 3/00* (2013.01)

(58) Field of Classification Search
CPC ...................................................... G21B 1/11
(Continued)

(56) References Cited

U.S. PATENT DOCUMENTS

| | | | | |
|---|---|---|---|---|
| 3,736,539 A | * | 5/1973 | File ........................ | H01F 6/00 335/216 |
| 4,166,760 A | * | 9/1979 | Fowler ................... | H05H 1/14 376/140 |

(Continued)

FOREIGN PATENT DOCUMENTS

| | | | | |
|---|---|---|---|---|
| GB | 2494185 A | | 3/2013 | |
| GB | 2528272 A | * | 1/2016 | ............... G21F 1/08 |

(Continued)

OTHER PUBLICATIONS

Search Report issued from the United Kingdom Patent Office for related Application No. GB1706648.1 dated Oct. 27, 2017 (3 pages).

(Continued)

*Primary Examiner* — Jason L McCormack
(74) *Attorney, Agent, or Firm* — Michael Best & Friedrich LLP

(57) ABSTRACT

Neutron shielding for the central column of a tokamak nuclear fusion reactor. The neutron shielding comprises an electrically conductive neutron absorbing material. The neutron shielding is arranged such that the electrically conductive neutron absorbing material forms a solenoid for the initiation of plasma within the tokamak.

23 Claims, 3 Drawing Sheets

(58) Field of Classification Search
USPC .................. 250/505.1, 506.1, 515.1, 518.1
See application file for complete search history.

(56) References Cited

U.S. PATENT DOCUMENTS

| | | | |
|---|---|---|---|
| 6,028,906 A * | 2/2000 | Kawashima | G21C 7/113 376/260 |
| 2005/0170972 A1* | 8/2005 | Salama | H01L 39/2487 505/430 |
| 2014/0211900 A1 | 7/2014 | Kingham et al. | |

FOREIGN PATENT DOCUMENTS

| | | | |
|---|---|---|---|
| GB | 2528272 A | 1/2016 | |
| GB | 2529412 A | 2/2016 | |
| KR | 1020090025382 A | 10/2009 | |
| RU | 2522580 C2 | 7/2014 | |
| RU | 2561989 C1 | 9/2015 | |
| WO | 2017049406 A1 | 3/2017 | |

OTHER PUBLICATIONS

International search Report with Written Opinion for related Application No. PCT/GB2018/051055 dated Jun. 12, 2018 (11 pages).
International Preliminary Report on Patentability for related Application No. PCT/GB2018/051055 dated Oct. 29, 2019 (7 Pages).
Notice of Non-Final Rejection from the Korean Intellectual Property Office for Application 10-2019-7034940 dated Mar. 24, 2020 (5 pages).
Search Report issued by the Federal Institute of Industrial Property for Application No. 2019137966/07 dated Jan. 10, 2020 (2 pages).

\* cited by examiner

COMBINED NEUTRON SHIELD AND SOLENOID

FIELD OF THE INVENTION

The present invention relates to the field of tokamak fusion reactors. In particular the invention relates to a combined neutron shield and solenoid for use in the central column of a tokamak, particularly a spherical tokamak.

BACKGROUND

A tokamak features a combination of strong toroidal magnetic field, high plasma current and, usually, a large plasma volume and significant auxiliary heating, to provide hot, stable plasma. This allows tokamaks to generate conditions so that fusion can occur. The auxiliary heating (for example via tens of megawatts of neutral beam injection of high energy H, D or T) is necessary to increase the temperature to the sufficiently high values required for nuclear fusion to occur, and/or to maintain the plasma current.

The problem is that, because of the large size, large magnetic fields, and high plasma currents generally required, build costs and running costs are high and the engineering has to be robust to cope with the large stored energies present, both in the magnet systems and in the plasma, which has a risk of 'disrupting'—mega-ampere currents reducing to zero in a few thousandths of a second in a violent instability.

The situation can be improved by contracting the donut-shaped torus of a conventional tokamak to its limit, having the appearance of a cored apple—the 'spherical' tokamak (ST). The first realisation of this concept in the START tokamak at Culham demonstrated a huge increase in efficiency—the magnetic field required to contain a hot plasma can be reduced by a factor of 10. In addition, plasma stability is improved, and building costs reduced.

To obtain the fusion reactions required for economic power generation (i.e. much more power out than power in), a conventional tokamak would have to be huge so that the energy confinement time (which is roughly proportional to plasma volume) can be large enough so that the plasma can be hot enough for thermal fusion to occur.

WO 2013/030554 describes an alternative approach, involving the use of a compact spherical tokamak for use as a neutron source or energy source. The low aspect ratio plasma shape in a spherical tokamak improves the particle confinement time and allows net power generation in a much smaller machine. However, a small diameter central column is a necessity, which presents challenges for design of the plasma confinement vessel and associated magnets.

During the initial phase of starting up a tokamak, the neutral gas which fills the confinement vessel must be ionised to produce a plasma. The process, known as "breakdown", "formation" or "initiation", is achieved by passing a time varying current through toroidally wound poloidal field (PF) coils of the tokamak. This time varying current generates a "loop voltage" inside the vessel that, when sufficiently large, causes the gas to break down and form a plasma. The loop voltage produced is a function of the position of the toroidal field coils and the time variation of the current. As well as generating a loop voltage inside the vessel, a current will also be induced in any other toroidally wound conducting loops (e.g. the plasma or the confinement vessel wall).

The most common plasma formation technique uses a solenoid wound in the central column of the tokamak to carry the time varying current and generate the loop voltage. This method is well known, reliable, and used in the majority of tokamaks. However, the compact geometry of spherical tokamaks makes implementation of this method problematic—there is limited space in the centre of the torus, and this space is needed for the toroidal field coils, cooling, and neutron shielding. As the size and efficiency of a spherical tokamak is related to the size of the central region, the space taken up by a solenoid has a direct impact on this efficiency. Current spherical tokamaks such as MAST and NSTX use a solenoid—but the increased neutron load expected in next generation fusion reactors would make the designs used for those tokamaks impractical due to the extra shielding required.

SUMMARY

According to a first aspect, there is provided neutron shielding for the central column of a tokamak nuclear fusion reactor. The neutron shielding comprises an electrically conductive neutron absorbing material. The neutron shielding is arranged such that the electrically conductive neutron absorbing material forms a solenoid for the initiation of plasma within the tokamak.

Further embodiments are described in claim 2 et seq.

DETAILED DESCRIPTION

Figure 1:
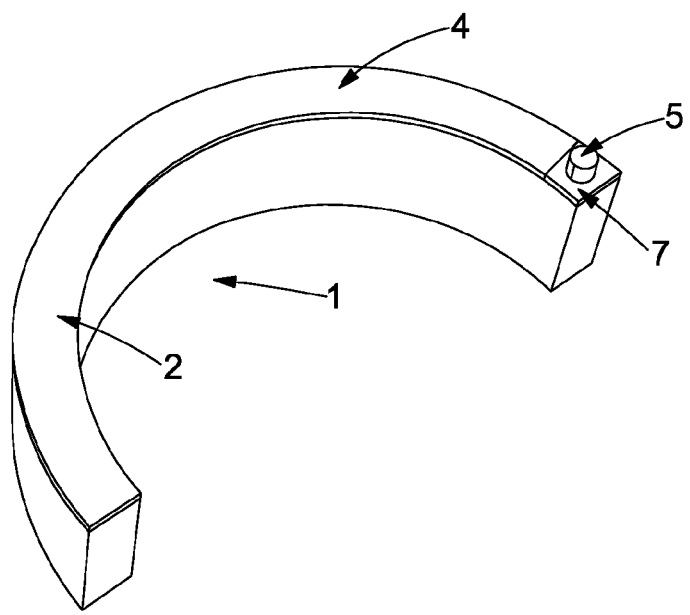
FIGS. 1 and 2 show a shield segment according to an exemplary construction.

The use of a conductive material for neutron shielding enables the construction of the neutron shielding and solenoid in a single unit. In other words, the neutron shielding may be constructed in the form of a solenoid, and a power supply provided so that the plasma initiation current may be driven through this solenoid. A suitable material must be both electrically conductive (e.g. with a conductivity of greater than 1 MS/m at 300K) and neutron absorbing. The neutron shield may be constructed so that there is a helical current path along the central column, forming the solenoid. If there are multiple layers of shielding, alternate layers may have helices with a different sense of rotation, such that the layers may be connected alternately at the top and bottom to form a single solenoid, similar to layers in a conventional wound wire solenoid.

While the below description is applicable to shielding for the central column of any tokamak, it is particularly beneficial for a spherical tokamak due to the constraints imposed on the width of the central column by the spherical tokamak design.

Electrically insulating material may be provided within the shielding to define the current path. This insulating material may be neutron shielding itself, or it may have limited or no neutron shielding effect. In the latter case, multiple layers of neutron shielding should be used, arranged such that there is no "line of sight" through the insulating material from the plasma chamber to the central column (i.e. no straight path leading from the plasma chamber to the central column along which a neutron could travel). Alternatively, the neutron shielding may be constructed such that there is no line of sight even where only a single layer is used. Otherwise, areas of the central column which have line of sight to the plasma chamber will experience much higher and potentially damaging radiation doses.

The neutron shield may be constructed from several segments of electrically conductive neutron absorbing material, which are connected together to form a helical current path. As an example, this may be done by connecting several segments, each of which is a segment of a helix, or by stacking several horizontal annular arc segments, with each being connected vertically to the next to form an approximately helical path (shown in more detail in the example of FIG. 3, described below).

The segments may be connected by interlocking cooperating features to provide both electrical connection and structural rigidity. Alternatively, there may be separate features providing each of structural connection and electrical connection (e.g. a non-conducting set of interlocking cooperating features which hold the segments in place such that there is contact between conducting faces). The features providing structural connection may have shear strength greater than that of the electrically conductive neutron absorbing material.

The segments may have insulating layers to prevent unwanted electrical contact between the segments, or the insulating layers may be provided separately during construction of the neutron shielding. The segments may comprise an material with a lower resistivity than the electrically conductive neutron absorbing material placed to facilitate the electrical connection.

An exemplary construction will now be described. However, it will be apparent to the skilled person that many other constructions are possible, particularly in light of the ability to cast cemented carbides into a variety of shapes.

Figure 2:
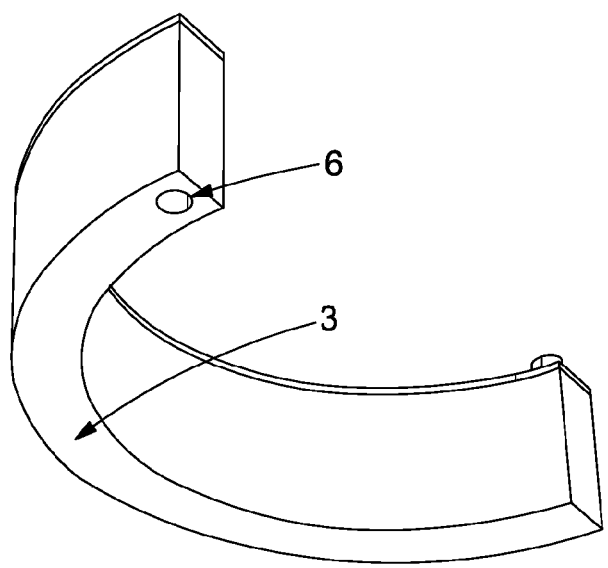

FIGS. 1 and 2 show a shield segment 1 according to the exemplary construction. The shield segment has top 2 and bottom 3 surfaces which form annular arcs, and the shield segment has sides which extend generally vertically between the top and bottom surfaces. An insulating layer 4 is provided on the top surface of the segment, except where it connects to the next segment in the helix, and on one of the end surfaces of the segment. The connection to the next segment is made using complementary interlocking features located at one end of the top surface and at the opposite end of the bottom surface, such as a protrusion 5 and corresponding recess 6. The protrusion 5 is made from a material with a higher shear strength than the electrically conductive neutron absorbing material, to provide additional rigidity to the segments. Alternatively, a recess may be provided in each segment on both the top and bottom surface, and a dowel or similar connection inserted into both recesses to connect the segments.

Electrical connection is achieved by the use of an electrically conductive region 7 of the top surface, which extends to the same level as the insulating material (otherwise, there would be a gap between the electrically conductive neutron absorbing material the thickness of the insulating layer). This may be an extension of the electrically conductive neutron absorbing material, or it may be a patch of a different electrically conductive material, e.g. one with a higher conductivity thean the rest of the neutron shield, e.g. copper.

Figure 3:
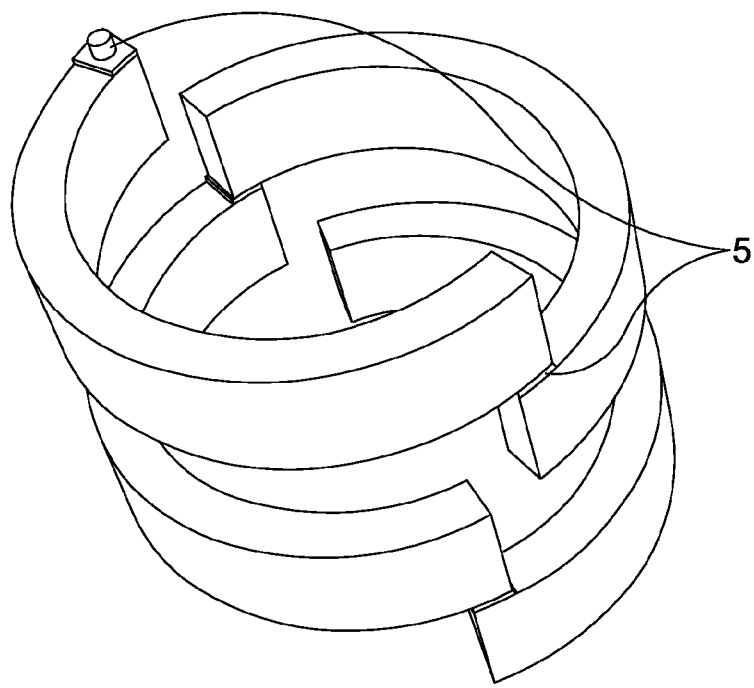
FIG. 3 shows how the segments of FIGS. 1 and 2 may be arranged to form a solenoid coil according to an exemplary construction.
Figure 4:
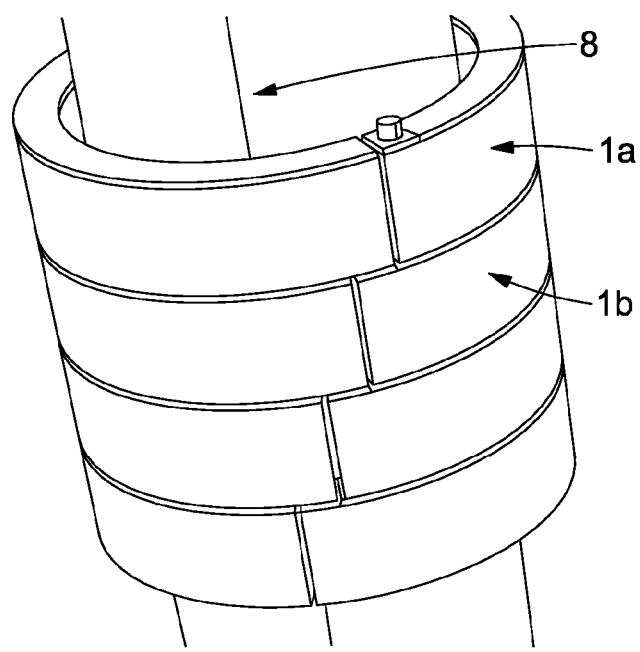
FIG. 4 shows how the segments of FIGS. 1 and 2 may be arranged to form a complete shielding layer according to an exemplary construction.

FIG. 3 shows how the segments may be arranged to form a solenoid coil, with the protrusion or dowel 5 of each segment being locked into the bore of the next segment, and arranged to form an approximately helical shape. As shown in FIG. 4, where the arc angle is a little less than 180°, a complete shielding layer is provided by having two "series" 1a and 1b of segments, each defining a separate helix. FIG. 4 also demonstrates how the segments are arranged around the cryostat 8 of the central column.

Figure 5:
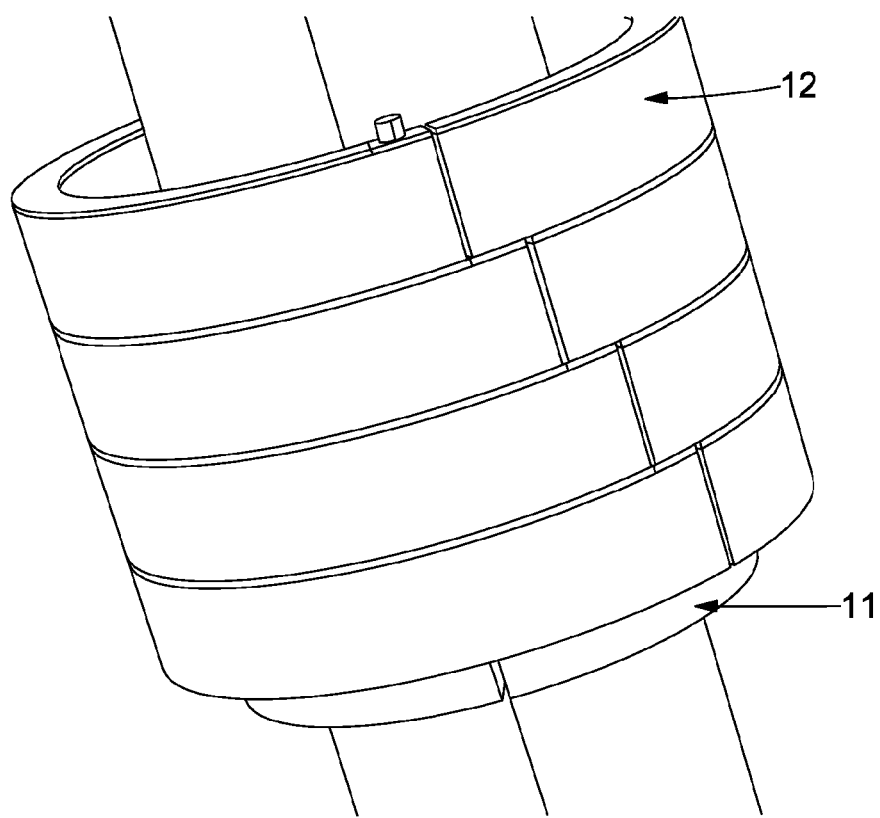
FIG. 5 shows two such shielding layers overlaid on each other according to an exemplary construction.

In order to prevent there being line-of-sight through the insulating layer, a second layer 12 of shielding segments may be overlaid on the first layer 11 as shown in FIG. 5. The segments of the second layer have an inner radius corresponding to (or slightly greater than) the outer radius of the segments of the first layer, and the complementary interlocking features of the segments of the second layer are provided on the opposite ends of the upper/lower surfaces compared to those of the first layer. This allows the second layer to wrap around the first layer, and ensures that the second layer is wound in the opposite sense of rotation. As such, the first and second layer may be connected at the top or bottom to form a single solenoid. Alternatively, the second layer may be wound in the same sense and connected in parallel. The second layer is offset in the axial and rotational directions from the first layer to avoid any line of sight through the insulating layers.

There are several possibilities for electrically conductive, neutron absorbing materials. Previous work has shown the suitability of cemented carbides, borides, or borocarbides, e.g. tungsten carbide, as a neutron shielding material (see WO 2016/009176 A1). These materials are electrically conductive (due to the metal binder and often the carbide/boride aggregate being conductive). Cemented carbides are a metal matrix composite in which particles of a carbide act as the aggregate, and a metallic binder serves as the matrix. Cemented carbides are formed by a sintering process, in which the material is heated to a point where the binder is liquid, but the carbide particles remain solid. The carbide grains are thereby embedded into the liquid binder, which is then allowed to set. This results in a material with superior qualities to either the carbide or the binder taken alone. The ductile binder offsets the natural brittleness of the carbide ceramic, and the carbide particles make the resulting composite much harder than the binder alone. Due to the metal binder, cemented carbides typically have a high thermal conductivity, which reduces the thermal stress experienced by the material due to uneven heating. The coefficient of linear thermal expansion of cemented carbides or borides is typically in the range of 4 to $5\times10^{-6}$. Cemented materials are also resistant to sputtering (ablation of the outer surface of the material by energetic particles). For example, cemented tungsten carbide typically has one quarter of the sputtering rate of pure tungsten.

Cemented borides are equivalent, but using boride particles as the aggregate, rather than carbide. Borocarbide particles may also be used.

The choice of carbide/boride and binder will be guided by the conditions in the reactor. The need to withstand high neutron flux prevents the use of many elements and isotopes, such as cobalt and nickel, which would become radioactive due to neutron exposure. High magnetic fields require structural considerations to be taken into account when using ferromagnetic material, as the resulting forces would cause large stresses within the reactor. Similar considerations occur for the choice of carbide. Also, the material must of course be able to reduce the flux of neutrons which reach components behind the shield. Carbon will naturally act as a moderator, slowing the fission neutrons down, which allows greater freedom of choice in the other elements that may be used (since many more elements are effective absorbers of slow neutrons than faster neutrons). Boron-10 is an effective neutron absorber.

Promising candidates for the carbide are tungsten carbide, as the neutron absorption is favourable and the mechanical properties have been well studied, tungsten boride, and boron carbide, which combines the moderating properties of carbon with the neutron absorption of boron. Multiple carbides may be used in order to balance structural and neutronics properties of the material. In addition, other substances may be added to the cemented material in addition to the carbides, for example borides may be added to a predominantly carbide composite in order to introduce boron into the shielding, or vice versa. Addition of tungsten boride to a cemented tungsten carbide may improve the resistance to corrosion. Borocarbides which may be used include tungsten borocarbide, specifically a ternary tungsten borocarbide. Other substances that may be added to the material include oxides and nitrides, for example titanium nitride may be added to improve the structural properties of the material.

Other alternatives to tungsten carbide or tungsten borocarbide include borides and/or carbides of elements corresponding to the sixth period of the periodic table (or beyond). The melting points of the elements increase across the sixth period, peaking at group six (tungsten). Therefore the main candidate elements are hafnium, tantalum, tungsten and rhenium. The platinum metals may be theoretically suitable for neutron shielding but are considered to be less useful because osmium compounds are highly toxic, and because of the prohibitively high cost of iridium and platinum. Rhenium is also very expensive and very rare. The three most likely candidates are therefore hafnium, tantalum and tungsten. Of these, tungsten (including its compounds) is the cheapest and most widely available, and easy to process by powder methods.

Other suitable shielding materials include the pure metals of the sixth period of the periodic table, and alloys or compounds containing those metals, including composites containing an electrically conductive binder and an aggregate containing a non-conductive compound of such metals.

The invention claimed is:

1. Neutron shielding for the central column of a tokamak nuclear fusion reactor, the neutron shielding comprising an electrically conductive neutron absorbing material, wherein the neutron shielding is arranged such that the electrically conductive neutron absorbing material forms a solenoid for the initiation of plasma within the tokamak.

2. Neutron shielding according to claim 1, wherein the neutron shielding comprises an electrically insulating material arranged to separate turns of the solenoid formed by the electrically conductive neutron absorbing material.

3. Neutron shielding according to claim 1, wherein the neutron shielding is arranged such that any straight path between the location of the plasma during operation of the nuclear fusion reactor and the central column passes through the neutron absorbing material.

4. Neutron shielding according to claim 3, wherein the neutron shielding is formed from a plurality of radially arranged layers, each layer including neutron absorbing material arranged to cover gaps in the neutron absorbing material in other layers of the plurality of layers.

5. Neutron shielding according to claim 4, wherein each layer is constructed so as to form a solenoid, with alternate layers having opposite sense of winding, and wherein adjacent layers are connected in series at the top or bottom of the layers.

6. Neutron shielding according to claim 1, wherein the neutron shielding is constructed from a plurality of arcuate segments of the electrically conductive neutron absorbing material, wherein said segments are connected to provide a substantially helical current path.

7. Neutron shielding according to claim 6, wherein each segment comprises a first interlocking feature at one end of one face of the segment, and a second complementary interlocking feature at the opposite end of the opposite face of the segment, wherein the segments are connected by connecting the first interlocking feature of a first segment with the second interlocking feature of a subsequent segment.

8. Neutron shielding according to claim 7, wherein one end of a top arcuate face of the first segment is connected by the interlocking features to an opposite end of a bottom arcuate face of the subsequent segment.

9. Neutron shielding according to claim 7, wherein the first interlocking feature is a protrusion, and the second interlocking feature is a complementary recess.

10. Neutron shielding according to claim 7, wherein the first interlocking feature is a dowel, and the second interlocking feature is a complementary bore.

11. Neutron shielding according to claim 7, wherein the first interlocking feature is formed from a material having a greater shear strength than the electrically conductive neutron absorbing material.

12. Neutron shielding according to claim 7, wherein the first and/or second interlocking feature is formed from a material having a greater conductivity than the electrically conductive neutron absorbing material.

13. Neutron shielding according to claim 7, wherein each segment comprises an electrical connection region which is in contact with the respective subsequent segment, and a layer of insulating material arranged such that the only connection between segments is via the electrical connection region of each segment.

14. Neutron shielding according to claim 13, wherein the electrical connection region comprises a material having a greater conductivity than the electrically conductive neutron absorbing material.

15. Neutron shielding according to claim 14, wherein the electrical connection region comprises a patch made of a metal.

16. Neutron shielding according to claim 6, wherein each segment has top and bottom surfaces defined by two circular arcs and the lines connecting their ends, where the circular arcs have common angle and centre, and each segment has sides which extend vertically between the top and bottom surfaces.

17. Neutron shielding according to claim 16, wherein the angle of each circular arc is less than 180 degrees, and the segments are arranged to provide two or more helical current paths.

18. Neutron shielding according to claim 6, wherein the segments are arranged in two layers, the second layer being arranged radially outward of the first layer, and displaced axially and rotationally from the first layer such that any straight path between the location of the plasma during operation of the nuclear fission reactor and the central column passes through neutron shielding.

19. Neutron shielding according to claim 1, wherein the electrically conductive neutron absorbing material is a cemented carbide and/or boride comprising a binder and an aggregate, the aggregate comprising particles of a carbide and/or boride compound, and the binder comprising a metal.

20. Neutron shielding according to claim 19, wherein the aggregate comprises one or more of:
   tungsten carbide;
   tungsten boride;
   a ternary tungsten borocarbide.

21. Neutron shielding according to claim 1, wherein the electrically conductive neutron absorbing material has an electrical conductivity at 300K greater than $10^6$ S/m.

22. Neutron shielding according to claim 1, wherein the electrically conductive neutron absorbing material comprises a metal of the sixth period of the periodic table.

23. Neutron shielding according to claim 15, wherein the metal is copper.

* * * * *

UNITED STATES PATENT AND TRADEMARK OFFICE
CERTIFICATE OF CORRECTION

PATENT NO. : 10,847,269 B2
APPLICATION NO. : 16/607391
DATED : November 24, 2020
INVENTOR(S) : Paul Noonan and Marcel Kruip Page 1 of 1

It is certified that error appears in the above-identified patent and that said Letters Patent is hereby corrected as shown below:

On the Title Page

Under the subheading "PCT Pub. No.," Line 1:
Replace "WO2018/179846"
With --WO2018/197846--

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*